May 20, 1930.   J. E. CARROLL   1,759,039
MOTION TRANSLATING DEVICE
Filed Dec. 12, 1928   2 Sheets-Sheet 1
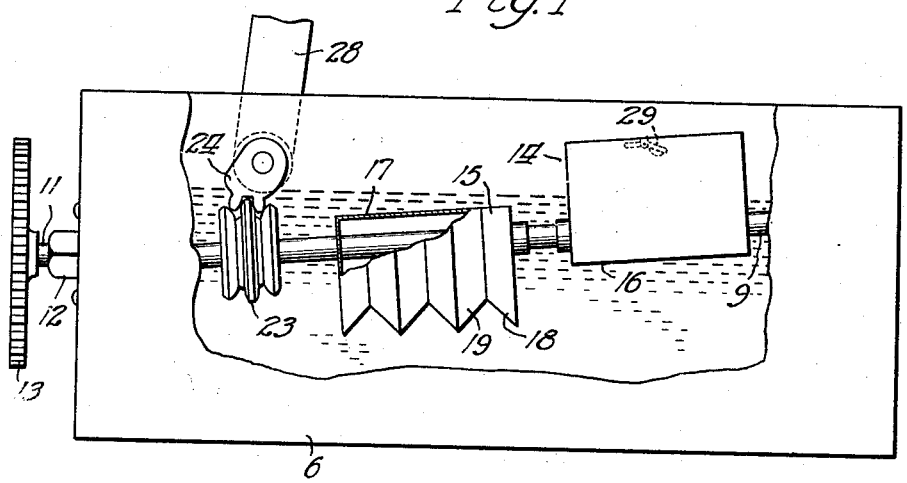
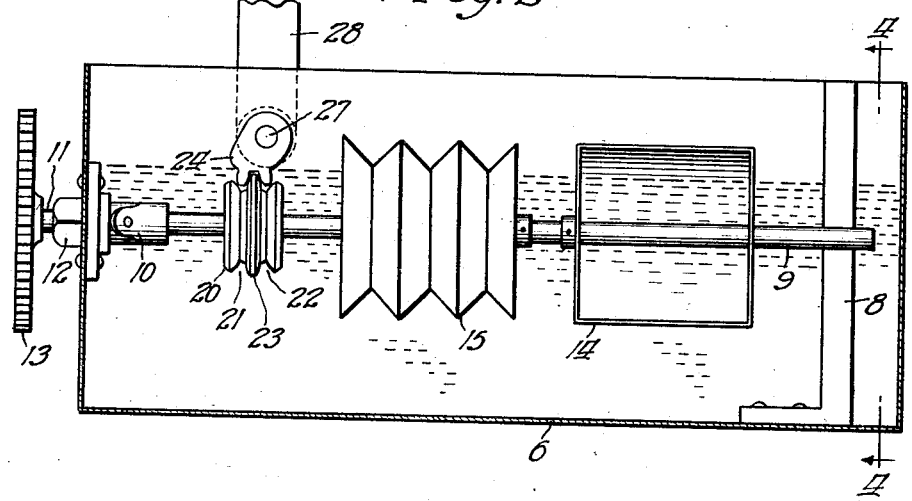
Inventor
John E. Carroll May 20, 1930.  E. CARROLL  1,759,039
MOTION TRANSLATING DEVICE
Filed Dec. 12, 1928  2 Sheets-Sheet 2
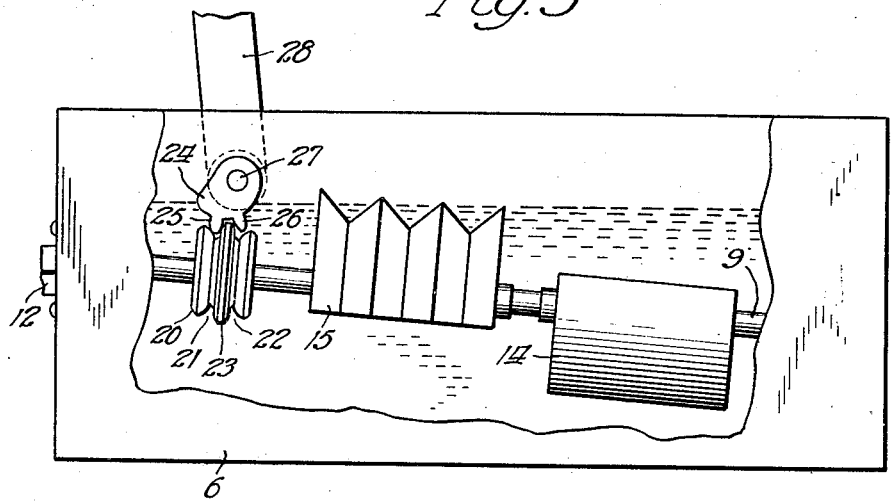
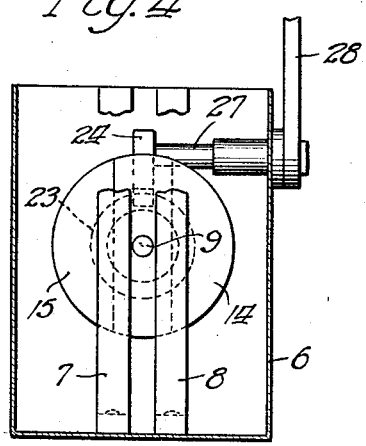
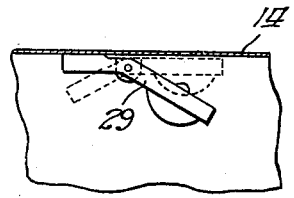
Inventor
John E. Carroll Patented May 20, 1930

1,759,039

UNITED STATES PATENT OFFICE

JOHN E. CARROLL, OF CHICAGO, ILLINOIS

MOTION-TRANSLATING DEVICE

Application filed December 12, 1928. Serial No. 325,477.

My invention relates to motion translating devices and more particularly to means whereby a rocking or rotating motion may be translated into a swinging motion of a certain extent.

The principal purpose of this invention is to provide a float operated device by means of which a certain definite angular movement may be reproduced continuously without variation in its extent.

Another purpose of the invention is to provide a simple and novel means for changing the motion of a swinging or rotating shaft into a swinging motion the extent of which is entirely independent of the speed of rotation of the shaft.

Other objects and advantages of the invention will appear as the description proceeds in connection with the accompanying drawings. It is obvious however that various modifications may be made without departing from the scope of the invention and I intend to avail myself of all such modifications as come within the scope of the claims.

In the drawings:

Fig. 1 is a side view partly in section of my improved device;

Fig. 2 is a sectional view illustrating the device in another position;

Fig. 3 is a still further view similar to Fig. 1 illustrating a third position;

Fig. 4 is a section on the line 4—4 of Fig. 2; and

Fig. 5 is a detailed view of a portion of the device.

Referring now in detail to the drawings, the numeral 6 indicates a container for a liquid such as water. Within this container there are located a pair of vertical guide members 7 and 8 and a shaft 9 which has one end extending between said guide members and free to move up and down therebetween. The other end of the shaft 9 is connected by means of a universal joint 10 with a shaft 11 which extends through a stuffing box at 12 to the exterior of the container 6. It is obvious however that shaft 11 may terminate inside the container 6 and be driven by some mechanism therein, the wheel 13 in this case being connected to the shaft 11 in order to turn it.

Upon the shaft 9 there are secured a dipper 14 and a float 15 each of which is substantially in the form of a section of a cylinder, the dipper being disposed substantially opposite the float so that when the open face of the dipper at 16 is down, the flat surface of the float at 17 is up. The float 15, however which in this form is a hollow sealed tank of metal, has corrugations as indicated at 18 and 19 in the curved surface thereof to expose a greater surface to the liquid. Between the float 15 and the universal joint 10 there is fixed upon the shaft the member 20 which is provided with the grooves 21 and 22 separated by the rib 23. Cooperating with the member 20 there is the cam 24 which has the gear teeth 25 and 26 thereon fitting within the annular grooves 21 and 22. This cam member 24 is fixed to a shaft 27 which is in turn fixed to a lever 28 that may be utilized for operating any suitable mechanism. The dipper 14 has in its bottom a gravity operated valve 29 which is adapted, when the dipper is wrong side up, to open and let air into the dipper and which closes by gravity when the dipper is right side up.

The device operates as follows: Let us assume that the wheel 13 is being rotated from the position shown in Fig. 1; upon a quarter turn it will reach the position shown in Fig. 2, and as the shaft 9 turns the float 15 will turn therewith as will the dipper 14 which dipper will fill partly with the liquid as the float becoming higher respective to the shaft 9 gradually permits the shaft to drop. As the action continues, the float will eventually, after the rotation of substantially 180 degrees, reach the position shown in Fig. 3 in which position the dipper 14 will become filled with the liquid; and the shaft 9 will be in its extreme lowermost position owing to the fact that now the greater portion of the float 15 is above the shaft instead of below it.

Thus the continued rotation of the shaft 9 results also in an up and down motion of this shaft the extent of which depends wholly upon the relative positions of the dipper 14 and the float 15 in the liquid. This swinging motion is in turn communicated by means of the member 20, which moves with the shaft 9 about the universal joint as a pivot, to the eccentric cam 24 to cause this cam to swing slightly as the shaft 9 rises and falls, and this swinging action which will be of a constant extent is directly communicated to the lever arm 28.

From the above description it is thought that the construction and operation of this device will be clear to those skilled in this art; and having thus described my invention, what I claim as new and desire to secure by Letters Patent is:

1. A device of the character described comprising a liquid container, a shaft in said container having one end free for vertical movement, means associated with said shaft for turning the same, a float on said shaft offset with respect to the axis thereof, a dipper on said shaft offset oppositely from said float with respect to said shaft.

2. A device of the character described comprising a liquid container, a shaft in said container having one end free for vertical movement, means associated with the other end of said shaft for turning the same, a float on said shaft offset with respect to the axis thereof, a dipper on said shaft offset oppositely from said float with respect to said shaft.

3. A device of the character described comprising a liquid container, a shaft in said container having one end free for vertical movement, means associated with said shaft for turning the same, a float on said shaft offset with respect to the axis thereof, a dipper on said shaft offset oppositely from said float with respect to said shaft whereby upon turning of said shaft the float and dipper will cause its free end to move up or down, and means for guiding the free end of said shaft.

4. A device of the character described comprising, a container adapted to contain a liquid, a shaft in said container, a member for turning said shaft, said member and shaft being connected by a universal joint, and a float element eccentrically mounted on said shaft whereby upon turning said shaft it will be swung vertically by said float about said joint as a pivot.

5. A device of the character described comprising, a container adapted to contain a liquid, a shaft in said container, a member for turning said shaft, said member and shaft being connected by a universal joint, and a float element eccentrically mounted on said shaft whereby upon turning said shaft it will be swung vertically by said float about said joint as a pivot, and guide means associated with said shaft to guide it in its vertical movement.

6. A device of the character described comprising, a container adapted to contain a liquid, a shaft in said container, a member for turning said shaft, said member and shaft being connected by a universal joint, and a float element consisting of a section of a cylinder eccentrically mounted on said shaft whereby upon turning said shaft it will be swung vertically by said float about said joint as a pivot.

7. A device of the character described comprising, a container adapted to contain a liquid, a shaft in said container, a member for turning said shaft, said member and shaft being connected by a universal joint, and a float element consisting of a section of a cylinder eccentrically mounted on said shaft whereby upon turning said shaft it will be swung vertically by said float about said joint as a pivot, said float having corrugations on the curved surface thereof.

8. A device for changing a rotating movement to a swinging movement of constant amplitude comprising a shaft having a universal connection to a turning member, a container having liquid in which said shaft is located, a float on said shaft, a dipper on said shaft oppositely disposed relative to said float, said float and dipper cooperating with said liquid to give said shaft an up and down swinging movement as it is rotated, and guide means for guiding said shaft in its movement up and down.

In witness whereof, I hereunto subscribe my name this 5th day of December, A. D. 1928.

JOHN E. CARROLL.